US007083731B2

(12) United States Patent
Ekman et al.

(10) Patent No.: US 7,083,731 B2
(45) Date of Patent: Aug. 1, 2006

(54) PRECIOUS METAL SCAVENGING FROM A LIQUID MEDIUM WITH A FUNCTIONALISED POLYMER FIBER

(75) Inventors: Kenneth Ekman, Piispanristi (FI); Robert Peltonen, Kaarina (FI); Mars Sundell, Littoinen (FI); Richard Alfred Teichman, III, Voorhees, NJ (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 10/399,578

(22) PCT Filed: Oct. 11, 2001

(86) PCT No.: PCT/GB01/04540

§ 371 (c)(1),
(2), (4) Date: Aug. 6, 2003

(87) PCT Pub. No.: WO02/33135

PCT Pub. Date: Apr. 25, 2002

(65) Prior Publication Data

US 2004/0026329 A1 Feb. 12, 2004

(30) Foreign Application Priority Data

Oct. 18, 2000 (GB) .................... 0025502.6

(51) Int. Cl.
*B01D 15/38* (2006.01)
(52) U.S. Cl. ............... 210/666; 75/632; 75/633; 210/670; 210/679; 210/688; 210/729; 210/912
(58) Field of Classification Search ........ 210/666, 210/669, 670, 673, 674, 679, 687, 688, 729, 210/769, 912–914; 75/421–423, 633, 634, 75/637
See application file for complete search history.

(56) References Cited

U.S. PATENT DOCUMENTS

| 4,092,250 A | | 5/1978 | Sano et al. ............... 210/501 |
| 4,156,647 A | * | 5/1979 | Nieuwenhuis ............ 210/684 |
| 4,167,481 A | * | 9/1979 | Cremers et al. ........... 210/679 |
| 4,273,578 A | | 6/1981 | Nesvadba et al. ............ 75/83 |
| 4,331,541 A | * | 5/1982 | Akiyama et al. .......... 210/679 |
| 4,386,006 A | | 5/1983 | Harrington ................ 252/184 |
| 4,388,279 A | | 6/1983 | Quick ..................... 423/22 |
| 4,500,396 A | | 2/1985 | D'Agostino et al. ........ 204/107 |
| 4,543,169 A | | 9/1985 | D'Agostino et al. ........ 204/106 |
| 4,687,514 A | | 8/1987 | Renner et al. ............... 75/109 |
| 4,693,828 A | * | 9/1987 | Yoshioka et al. .......... 210/679 |
| 4,747,954 A | * | 5/1988 | Vaughn et al. ............ 210/670 |
| 5,019,516 A | * | 5/1991 | Wiese ....................... 436/77 |
| 5,208,194 A | | 5/1993 | Pitchai et al. ............. 502/12 |
| 5,500,126 A | * | 3/1996 | Fries ........................ 210/668 |
| 5,536,416 A | * | 7/1996 | Coltrinari et al. .......... 210/723 |
| 6,277,290 B1 | * | 8/2001 | Ren et al. .................. 210/749 |
| 6,656,360 B1 | * | 12/2003 | Rohrbach et al. .......... 210/638 |
| 6,869,537 B1 | * | 3/2005 | Nambu et al. ............. 210/683 |

FOREIGN PATENT DOCUMENTS

| EP | 0 227 893 | | 7/1987 |
| EP | 0 355 837 | | 2/1990 |
| EP | 0 429 017 | | 5/1991 |
| GB | 2 085 856 | | 5/1982 |
| GB | 2 127 001 | | 4/1984 |
| JP | 05057280 A | * | 8/1991 |
| WO | WO 90/10721 | | 9/1990 |

OTHER PUBLICATIONS

Abstract of Japanese Patent No. 52-123986 (published Oct. 18, 1977).
Abstract of Japanese Patent No. 62-083,006 (published Apr. 16, 1987).
Abstract of Japanese Patent No. 62-238337 (published Oct. 19, 1987).
Abstract of Japanese Patent No. 63-135432 (published Jun. 7, 1988).
Abstract of Soviet Union Patent No. 311534 (published Nov. 25, 1977).
International Search Report, from International Application No. PCT/GB01/04540, dated Mar. 19, 2002.
British Search Report, from British Application No. 0025502.6, dated Feb. 15, 2001.

* cited by examiner

*Primary Examiner*—Peter A. Hruskoci
(74) *Attorney, Agent, or Firm*—RatnerPrestia

(57) ABSTRACT

A method for the recovery of a metal from a liquid medium containing the metal I solution or in finely divided insoluble from comprises contacting the medium with a functionalized polymer fiber capable of binding the metal and recovering the metal from the fiber. The polymer fiber is suitably a polyolefin, a fluorinated polyethylene, cellulose or viscose, which is functionalized by the radiation grafting of at least one monomer. The method is particularly suitable for the recovery of platinum group metals from process residues.

11 Claims, No Drawings

PRECIOUS METAL SCAVENGING FROM A LIQUID MEDIUM WITH A FUNCTIONALISED POLYMER FIBER

This application is the U.S. national phase application of PCT International Application No. PCT/GB01/04540.

This invention relates to a method for the scavenging of metals from liquid media, more particularly to a method for the recovery of platinum group metals (PGMs) from organic, aqueous or mixed organic/aqueous solutions.

The widespread use of noble metals such as PGMs as either heterogeneous or homogeneous catalysts for chemical processes generates substantial amounts of waste solutions or streams of various compositions. The economical use of catalysts based on PGMs is almost always dependent on the efficient recovery of the catalyst, whether by recycling the catalysts themselves, or by the efficient recovery and refining of the noble metal. As is known in the art, the PGMs comprise the lower members of group VIII of the periodic table namely, platinum, palladium, rhodium, iridium, ruthenium and osmium.

Heterogeneous catalysts, in which the noble metal is anchored to a solid support, are often easy to recover by filtration. Loss of metal is mainly due to the loss of fine particulates during filtration or due to solubilisation of the noble metal in the reaction media. The noble metals are usually recovered by incineration and/or leaching procedures and the noble metal is worked up in a conventional manner.

However, the recovery of homogeneous catalysts is not straightforward. If the reaction solution, including reactants, product(s) and solvent, is low boiling and composed only of noble metal compounds, the metal can be concentrated using distillation and the catalysts can possibly be reused several times. If the solution contains other non-noble metal inorganic compounds, salts or high boiling solvents, a useful way of recovery is to add the solution to the smelting process of a noble metal melt. Other ways of treating organic solutions include combustion and pyrolysis however, such processes may give rise to air pollution, especially when phosphorous is present in the work up solutions. Furthermore, losses of precious metals in any pyrometallurgical process can be high as can processing costs, including capital and energy costs.

Processes based on precipitation of the noble metals have been developed. These are based for example, on the recovery of the noble metal by precipitation with elemental sulphur, or sulphur compounds (U.S. Pat. No. 4,273,578), or with elemental tellurium or reducible tellurium compounds (U.S. Pat. No. 4,687,514).

EP 0429017 A1 describes a process to remove rhodium containing catalysts from a solution of hydrogenated nitrile rubber, by passing the residue through an ion-exchange column containing a macroreticular resin modified with a selective amine, thiol, carbodithioate, thiourea and/or dithiocarbamate functional group. From the comparative examples presented in the patent it is clear that non-macroreticular resins, i.e. gel type resins, are unsuccessful in removing rhodium from organic solutions.

The invention described in U.S. Pat. No. 4,388,279 is concerned with a process for the recovery of trace amounts of noble metals which have been used as catalysts in organic reactions. Products resulting from such reactions are contacted with solid adsorbents selected from Group IA and Group IIA of the Periodic Table, molecular sieves and an ion exchange resins. Examples are given of the performance of calcium carbonate for the recovery of rhodium, but no data are given on the performance of ion exchange resins.

U.S. Pat. No. 5,208,194 describes a process for recovering Group VIII transition metal carbonyl complexes by contacting an organic solution with an acidic ion exchange resin containing sulfonic acid groups. Preferred resins are macroreticular or macroporous resins having surface areas greater than about 20 $m^2/g$. According to the patent, strongly basic, weakly basic, neutral, and weakly acidic ion exchange resins are unsuitable for use.

EP 0355837 A2 describes a method for recovery of a transition metal from polar or non-polar liquids, by contacting the liquid with an ion-exchange resin having bonded ionically thereto an organophosphorous ligand. The ligand is ion-exchanged onto traditional ion-exchange resins and the metal to be recovered forms a complex with the ligand.

EP 0227893 A2 describes a method for the removal of dissolved metals from solutions using a microporous ethylene polymer with pendant carboxylic acid groups. Comparative examples are described which show that equivalent non-porous materials are not effective. The porosity of the polymer is therefore crucial to the effectiveness of the process described. Furthermore, the polymer does not have equal affinity for similar metals for example, the affinity is higher for Pd, Ir and Ru than it is for Os, Re and Pt.

Hence, according to the state of the art, macroreticular and porous resins are preferred over gel-type ion-exchangers for recovery of precious metals from organic solutions. However, based on the patent literature, the recoveries obtained with macroreticular resins are inadequate to allow them to be used commercially in organic solutions. There are also many further problems attached to the use of macroreticular resins in metal scavenging applications from organic solutions. The mechanical stability of porous polymers is often not sufficient to withstand use in stirred reactors without creating fines. Osmotic stability is an even bigger problem since the loading of a homogeneous PGM complex with attached ligands gives a very high weight increase of the material inducing an osmotic shock that disintegrates the polymer and blocks pores. The porous structure also results in difficulties in further processing of the resins by for example, elution. During elution the material is transferred to an aqueous phase. The treated organic solutions are often viscous and difficult to remove from the porous material. Organic materials will block the pores of the resin and this material is poorly removed during the elution of the resin. Gel-type materials would hence be preferred. However, traditional gel-type resins function poorly in organic solution mainly due to the large dimensions of the beads, and due to the crosslinks introduced to the materials during preparation of the resins.

It is an object of the present invention to develop materials and methods for the easy, efficient and economical recovery of metals from organic solutions. It has now been found that ion-exchange groups attached to fibrous materials show excellent metal binding properties from various organic-based residues, solutions and streams.

In accordance with the present invention a method for the recovery of a metal from a liquid medium containing the metal in solution or in finely divided insoluble form comprises contacting the medium with a functionalised polymer fibre capable of binding the metal; and recovering the metal from the fibre.

The present invention has application to organic, aqueous and mixed organic/aqueous media containing metals in metallic or other insoluble form or, preferably, in solution. Such media may be process or effluent streams, or may be streams from the refining of metals, especially the refining of PGMs. The preferred media are those in which a single PGM is present in solution in an organic solvent or a mixed organic/aqueous solvent. Desirably, in the latter case, the organic solvent is miscible with the aqueous system. Some examples of mixed organic/aqueous media include dimethylformamide/water mixtures, alcohol/water mixtures, where the alcohol may be any liquid alcohol, or acetonitrile/HCl mixtures. Aqueous systems include salt or acid solutions.

The metal may be from any group of the periodic table for example, a transition metal, an alkali or alkaline earth metal such as Ca, a heavy metal, or a rare earth metal. Desirably, the metal comprises a transition metal, or a heavy metal such as Hg, Pb or Cd. The transition metal may be noble metal or a base metal active as a catalyst or catalyst promoter such as Ni, Co or W. Most preferably, the metal comprises a noble metal, especially one or more of the PGMs.

Preferably, the method further comprises the addition of a precipitating or complexing agent to yield a form of the metal having improved binding characteristics for the functionalised polymer fibre. Suitable precipitating or complexing agents include those selected from the group of thiourea, urea, amines and polyamines.

Preferably, the polymer is substantially non-porous. The lack of porosity provides the polymers with sufficient mechanical strength to withstand use in stirred reactors without creating fines. Difficulties associated with further processing of the polymers by for example, elution are also mitigated.

Preferably, the polymer fibre comprises a polymer chosen from the group; polyolefins, fluorinated polyethylene, cellulose and viscose.

Suitable polyolefins are those formed from units of $\alpha$-olefins, the units having the formula —$CH_2$—CHR—, where R is H or $(CH_2)_n CH_3$ and n is in the range of 0 to 20. Particularly suitable polyolefins are those which are homo- or co-polymers of ethylene and propylene. In the case of fluorinated polyethylenes, those formed from units of the general formula —$F_2$—$CX_2$—, where X is H or F are suitable. For example, polyvinylidene fluoride and polytetrafluoroethylene are particularly preferred.

It has been shown by the present inventors that noble metals or complexes of noble metals can be scavenged from organic or mixed aqueous/organic media using functionalised polymer fibres, that is polymer fibres onto which suitable functional groups have been introduced.

The functional groups can be introduced in various ways including radiation grafting, chemical grafting, chemical modification of pre-formed fibres or further chemical modification of grafted fibres, formation of interpenetrating networks etc. Preferably, the functional groups are introduced by radiation grafting.

Graft copolymers can be prepared in various ways but radiation grafting is an especially suitable method for graft modification of polymer fibres. Radiation grafting is generally known, and involves the irradiation of a polymer in a suitable form, for example, film, fibre, pellets, hollow fibre, membrane or non-woven fabric, to introduce reactive sites (free radicals) into the polymer chain. These free radicals can either combine to give crosslinks, as is the case for polyethylene, or cause chain scission as is the case for polypropylene. On the other hand, the free radicals can be utilised to initiate graft copolymerisation under specific conditions. Three different methods of radiation grafting have been developed; 1) direct radiation grafting of a vinyl monomer onto a polymer (mutual grafting); 2) grafting on radiation-peroxidized polymers (peroxide grafting); and 3) grafting initiated by trapped radicals (pre-irradiation grafting). Pre-irradiation grafting is mostly preferred since this method produces only small amounts of homopolymer in comparison to mutual grafting.

Preferably, the functionalised polymer fibre comprises at least one functional group selected from; carboxylic, sulphonic, pyridinium, isothiouronium, phosphonium, amine, thiol or the like, and grafted vinyl monomers such as acrylic acid, methacrylic acid, acrylates, methacrylates, styrene, substituted styrenes such as $\alpha$-methyl styrene, vinyl benzyl derivatives such as vinyl benzyl chloride, vinyl benzyl boronic acid and vinyl benzyl aldehyde, vinyl acetate, vinyl pyridine, and vinyl sulphonic acid.

The functionalised fibres may be added to the solution to be treated in a stirred tank or the solution to be treated may be passed through a column packed with the fibres. It may be advantageous to heat the solution for example, in the range from ambient to 100° C.

In the present invention, fibres may be used without further processing and be of any length however, they have the very substantial advantage over polymer beads in that they may be converted, using conventional technology, into a great variety of forms. Thus, fibres may be spun, woven, carded, needle-punched, felted or otherwise converted into threads, ropes, nets, tows or woven or non-woven fabrics of any desired form or structure. Fibres can easily be stirred in a liquid medium, and filtered off or otherwise separated therefrom. If desired, fibres of different characteristics can readily be combined in threads or fabrics, in order to optimise the metal scavenging properties for a particular feedstock medium. In an embodiment, fibres may be combined with inorganic fibres such as silica or alumina fibres in order to provide increased mechanical strength. This may be of use when the fibres are used in processes which involve high degrees of agitation or high turbulence.

The noble metal may be recovered by filtering the fibres from the solution and recovering the noble metal by eluting the fibres using an ion-displacing reagent such as a strong acid or salt or a complexing agent, e.g. a sodium salt, or by destroying the fibre structure, e.g. using pyrolysis or hydrolysis, to produce a metal concentrate. The concentrate can then be worked up in a conventional manner.

The invention will now be described by way of non-limiting example only, and it will be appreciated that skilled person will readily see many opportunities to use the present invention in all its aspects.

EXAMPLE 1

Polyethylene fibres were irradiated under inert atmosphere to total dose of 150 kGy using an electron accelerator operating at an acceleration voltage of 175 kV and beam current of 5 mA. The irradiated fibres were immediately immersed in a reaction mixture containing styrene, vinyl benzyl chloride and ethanol. The reaction mixture was purged with nitrogen before initiating the reaction and the grafting reaction was allowed to continue to completion, which usually took approximately 6 hours.

The resulting fibres were filtered from the reaction solution and washed firstly with ethanol and then with dichloroethane.

EXAMPLE 2

Polyethylene fibres were irradiated under an inert atmosphere to total dose of 150 kGy using an electron accelerator operating at an acceleration voltage of 175 kV and beam current of 5 mA. The irradiated fibres were immediately immersed in a reaction mixture containing 4-vinyl pyridine and ethanol. The reaction mixture was purged with nitrogen before initiating the reaction and the grafting reaction was allowed to continue to completion, which usually took approximately 6 hours. The resulting fibres were filtered from the reaction solution and washed firstly with ethanol and then with dichloroethane or with a dilute aqueous acid.

EXAMPLE 3

Polyethylene fibres were irradiated under an inert atmosphere to total dose of 150 kGy using an electron accelerator operating at an acceleration voltage of 175 kV and beam current of 5 mA. The irradiated fibres were immediately immersed in a reaction mixture containing styrene and ethanol. The reaction mixture was purged with nitrogen before initiating the reaction and the grafting reaction was allowed to continue to completion, which usually took approximately 6 hours. The resulting fibres were filtered from the reaction solution and washed firstly with ethanol and then with dichloroethane.

EXAMPLE 4

100 g fibres prepared as in Example 1 were stirred in ethanol for 1 hour. 20 g of thiourea dissolved in ethanol was added and the stirring continued for a further 2 hours. The fibres were filtered from the solution and washed with ethanol before further use.

EXAMPLE 5

Fibres prepared as in Example 3 were added to a solution of dichloroethane and left overnight. Chlorosulphonic acid was added under stirring and the stirring continued for 5 hours. The fibres were filtered from the solution and treated with 2M sodium hydroxide solution, washed with acidified water to pH 1, and finally washed repeatedly with distilled water.

EXAMPLE 6

130 g of an oxo-ester residue containing 395 ppm of palladium was dissolved in a dimethyl formamide/water mixture. Fibres prepared as in Example 2 were added to the solution and the dispersion stirred over night at room temperature. The palladium content of the solution decreased to 40 ppm.

EXAMPLE 7

The same solution as used in Example 6 was stirred at room temperature over night with fibres prepared as in Example 4. The palladium content of the solution decreased to 3 ppm.

EXAMPLE 8

A glass column was packed with fibres prepared as in Example 2. The same solution as in Example 6 was passed through the column. An ash content of 4% by weight, analysed as Pd, was achieved and less than 3 ppm Pd remained in solution.

EXAMPLE 9

A carbonylation residue solution containing 105 ppm of rhodium was stirred with fibres prepared as in Example 5. The rhodium content of the solution decreased to approximately 50 ppm when the solution was boiled in presence of the fibres.

EXAMPLE 10

The same solution as in Example 9 was stirred with fibres prepared as in Example 4. The rhodium content of the solution decreased to 45 ppm when stirred over night at 60° C. However, when thiourea in ethanol was added to the solution and stirring continued at 60° C. for approximately 2 hours the rhodium content of the solution decreased to 3 ppm.

EXAMPLE 11

Thiourea dissolved in ethanol was added to a hydroformylation residue solution containing 850 ppm of rhodium. Fibres prepared as in Example 5 were added to the solution under stirring. After 1 hour, the rhodium content of the solution decreased to 20 ppm. When DMF was used instead of ethanol, the rhodium content of the solution decreased to 10 ppm under similar reaction conditions.

EXAMPLE 12

A high boiling point distillation residue from a coupling reaction containing 4.5% palladium and 4.5% phosphorus, present as a triaryl phosphine, was dissolved in an ethanol/thiourea mixture under reflux. Fibres prepared as in Example 5 were added to the solution and stirred for 60 minutes. Approximately 97-99% of the palladium was recovered on the fibres.

EXAMPLE 13

A carbonylation residue containing 105 ppm of rhodium was used for a comparative trial of fibres versus a commercially-available strong acid cation exchanger ("Amberlyst"). This bead form ion-exchange material contains the same sulfonic acid functionality as the fibre prepared in Example 5. 80 ml ethanol containing 2 g thiourea was added to 200 ml of the carbonylation residue and heated at 60° C. for 30 minutes. To half of this solution, 2 g of dry Amberlyst beads were added and stirred at 60° C. for 2 h. To the other half of the solution, 2 g of dry fibres prepared as in Example 5 were added and stirred at 60° C. for 2 h. The recovery of rhodium for the Amberlyst beads was found to be 43%, compared with 98.5% for the scavenging fibres according to Example 5.

EXAMPLE 14

Fibres prepared according to example 4 were further treated by stirring for 2 hours in an ethanol solution containing 2M sodium hydroxide. The fibres were filtered from this solution, washed with distilled water and treated with acid to pH 1. The fibres were re-filtered and washed with distilled water to neutral pH.

EXAMPLE 15

Fibres prepared according to example 14 were immersed in a reaction residue from a coupling reaction which contained THF, triaryl phosphines and 30 ppm of palladium. The fibres and residue were refluxed for 1 hour, after which time no palladium was detectable in the reaction residue.

The invention claimed is:

1. A method for the recovery of a metal from a liquid medium containing the metal in solution or in finely divided insoluble form, the method comprising the steps of adding a precipitating or complexing agent to the medium, wherein the precipitating or complexing agent is selected from the group consisting of at least one of thiourea, urea, amines and polyamines; contacting the medium with a functionalised polymer fibre capable of binding the metal; and recovering the metal from the fibre; wherein the precipitating or complexing agent yields a form of the metal having improved binding characteristics for the functionalised polymer fibre; and wherein the liquid medium is a liquid organic medium and the metal comprises a platinum group metal (PGM).

2. A method according to claim 1, wherein the medium is a process residue of stream comprising catalyst residues or catalyst, an effluent stream or a refining stream from the refining metals.

3. A method according to claim 1, wherein the polymer fibre comprises a polymer selected from the group consisting of polyolefins, fluorinated polyethylene, cellulose and viscose.

4. A method according to claim 1, wherein the functionalised polymer fibre comprises at least one functional group selected from: carboxylic, sulphonic, pyridinium, isothiouronium, phosphonium, amine, thiol, grafted vinyl monomers, acrylic acid, methacrylic acid, acrylates, methacrylates, styrene, substituted styrenes, α-methyl styrene, vinyl benzyl derivatives, vinyl benzyl chloride, vinyl benzyl boronic acid, vinyl benzyl aldehyde, vinyl acetate, vinyl pyridine, and vinyl sulphonic acid.

5. A method according to claim 4, wherein the at least one functional group is introduced by radiation grafting.

6. A method according to claim 1, wherein the functionalised polymer fibre is spun, woven, carded, needle punched, felted or otherwise converted into threads, ropes, nets, tows or woven or non-woven fabrics.

7. A method according to claim 6, wherein the fibre is combined with inorganic fibres.

8. A method according to claim 1, wherein the liquid medium is heated at up to 100° C.

9. A method according to claim 1, wherein recovering the metal from the fibre comprises eluting with an ion-displacing reagent.

10. A method according to claim 9, wherein the ion-displacing reagent is selected from the group consisting of a strong acid, a salt and a complexing agent.

11. A method according to claim 1, wherein recovering the metal from the fibre comprises destroying the fibre by pyrolysis or hydrolysis.

* * * * *

UNITED STATES PATENT AND TRADEMARK OFFICE
CERTIFICATE OF CORRECTION

| | |
|---|---|
| PATENT NO. | : 7,083,731 B2 |
| APPLICATION NO. | : 10/399578 |
| DATED | : August 1, 2006 |
| INVENTOR(S) | : Kenneth Ekman et al. |

Page 1 of 1

It is certified that error appears in the above-identified patent and that said Letters Patent is hereby corrected as shown below:

Title Page, Item "(56), under "OTHER PUBLICATIONS," insert

--Abstract of Japanese Patent No. 1-185334
 Abstract of Japanese Patent No. 3-247704--.

Signed and Sealed this

Tenth Day of April, 2007

JON W. DUDAS
*Director of the United States Patent and Trademark Office*